United States Patent
Chen et al.

(10) Patent No.: US 10,735,977 B2
(45) Date of Patent: Aug. 4, 2020

(54) USER EQUIPMENT, BASE STATION, RADIO COMMUNICATION SYSTEM, AND RADIO COMMUNICATION METHOD

(71) Applicant: FUJITSU LIMITED, Kawasaki-shi, Kanagawa (JP)

(72) Inventors: Hongyang Chen, Kawasaki (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 16/137,764

(22) Filed: Sep. 21, 2018

(65) Prior Publication Data
US 2019/0028906 A1    Jan. 24, 2019

Related U.S. Application Data

(63) Continuation of application No. PCT/JP2016/061845, filed on Apr. 12, 2016.

(51) Int. Cl.
H04W 16/26 (2009.01)
H04W 72/02 (2009.01)
(Continued)

(52) U.S. Cl.
CPC ........... *H04W 16/26* (2013.01); *H04W 72/02* (2013.01); *H04W 74/0808* (2013.01); *H04W 88/04* (2013.01); *H04W 92/18* (2013.01)

(58) Field of Classification Search
CPC ............. H04W 72/02; H04W 72/0446; H04W 56/001; H04W 8/005; H04L 1/1614; H04L 5/1469
See application file for complete search history.

(56) References Cited

U.S. PATENT DOCUMENTS 6,333,936 B1 * 12/2001 Johansson ............... H04J 13/16
370/449
2008/0108355 A1    5/2008 Oleszcsuk
(Continued)

FOREIGN PATENT DOCUMENTS

JP    2007-43435 A    2/2007
JP    2008-118659 A    5/2008
(Continued)

OTHER PUBLICATIONS

Extended European search report with supplementary European search report and the European search opinion issued by the European Patent Office for corresponding European Patent Application No. 16898593.5, dated Feb. 21, 2019.
(Continued)

*Primary Examiner* — Ayaz R Sheikh
*Assistant Examiner* — Debebe A Asefa
(74) *Attorney, Agent, or Firm* — Myers Wolin, LLC

(57) ABSTRACT

A first communication device transmits a signal addressed to a second communication device by the use of one of resources included in a resource pool selected from a set of resource pools. On the other hand, each of third communication devices which relay the radio communication between the first communication device and the second communication device selects one resource pool from the set of resource pools in accordance with a predetermined rule which is defined on the basis of a hop count at the third communication device in the radio communication between the first communication device and the second communication device and the resource pool selected by the first communication device, and transfer the signal addressed to the second communication device by the use of one of the resources included in the selected resource pool to a next (Continued)

communication device in a relay order or the second communication device.

14 Claims, 11 Drawing Sheets

(51) Int. Cl.
*H04W 88/04* (2009.01)
*H04W 92/18* (2009.01)
*H04W 74/08* (2009.01)

(56) References Cited

U.S. PATENT DOCUMENTS

| | | |
|---|---|---|
| 2014/0064085 A1 | 3/2014 | Nakaya |
| 2017/0048811 A1 | 2/2017 | Seo |
| 2017/0064704 A1 | 3/2017 | Seo et al. |
| 2017/0126306 A1 | 5/2017 | Kim et al. |
| 2018/0139683 A1* | 5/2018 | Kwon ..................... H04W 4/80 |

FOREIGN PATENT DOCUMENTS

| | | |
|---|---|---|
| JP | 2008-147925 A | 6/2008 |
| JP | 2014-516498 A | 7/2014 |
| JP | 2016-32252 A | 3/2016 |
| WO | 2012/131925 A1 | 10/2012 |
| WO | 2012/144941 A1 | 10/2012 |
| WO | 2015/122684 A1 | 8/2015 |
| WO | 2015/130074 A2 | 9/2015 |
| WO | 2016/006859 A1 | 1/2016 |
| WO | 2016/017099 A1 | 2/2016 |

OTHER PUBLICATIONS

Schlienz et al., "Device to Device communication in LTE Whitepaper", Rohde & Schwarz, pp. 1-36, Sep. 29, 2015.
Ericsson, "Discussion on V2X Resource Allocation", Agenda Item: 6.2.8.1.1, 3GPP TSG-RAN WG1 Meeting #83, R1-157372 Anaheim, USA, Nov. 15-22, 2015.
Fujitsu, "Discussion of Resource Allocation for PC5 based V2V", Agenda Item: 6.2.8.1.1, 3GPP TSG-RAN WG1 Meeting #83, R1-156618, Anaheim, USA, Nov. 15-22, 2015.
Beijing Xinwei Telecom Techn., "V2X resource allocation with cooperative diversity", Agenda Item: 7.2.8.2.1, 3GPP TSG-RAN WG1 Meeting #82bis, R1-155954, Malmö, Sweden, Oct. 5-9, 2015.
International Search Report issued by the Japan Patent Office for corresponding International Patent Application No. PCT/JP2016/061845, dated Jun. 28, 2016, with an English translation.
Written Opinion of the International Searching Authority issued by the Japan Patent Office for corresponding International Patent Application No. PCT/JP2016/061845, dated Jun. 28, 2016, with an English translation.
Notification of Reasons for Refusal issued by the Japan Patent Office for corresponding Japanese Patent Application No. 2018-511804, dated Sep. 24, 2019, with an English translation.

* cited by examiner

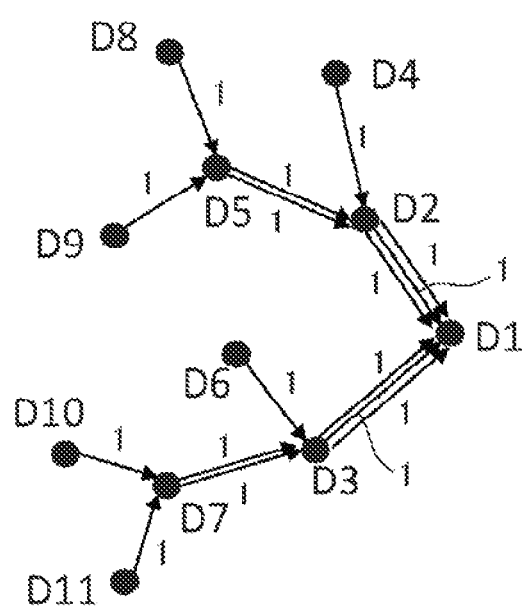

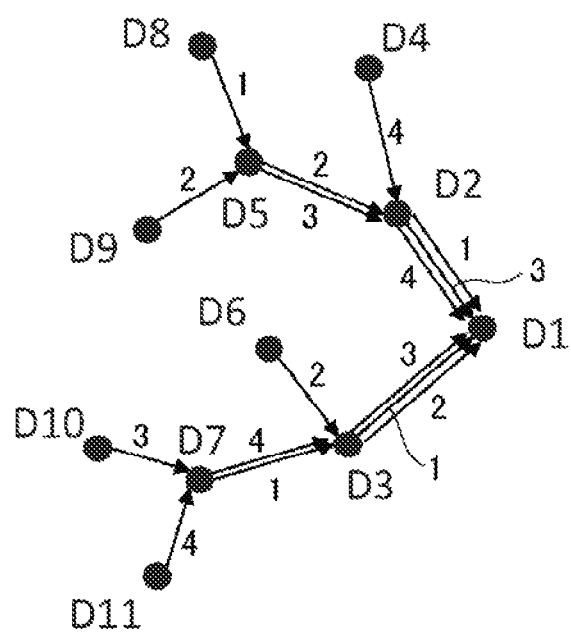

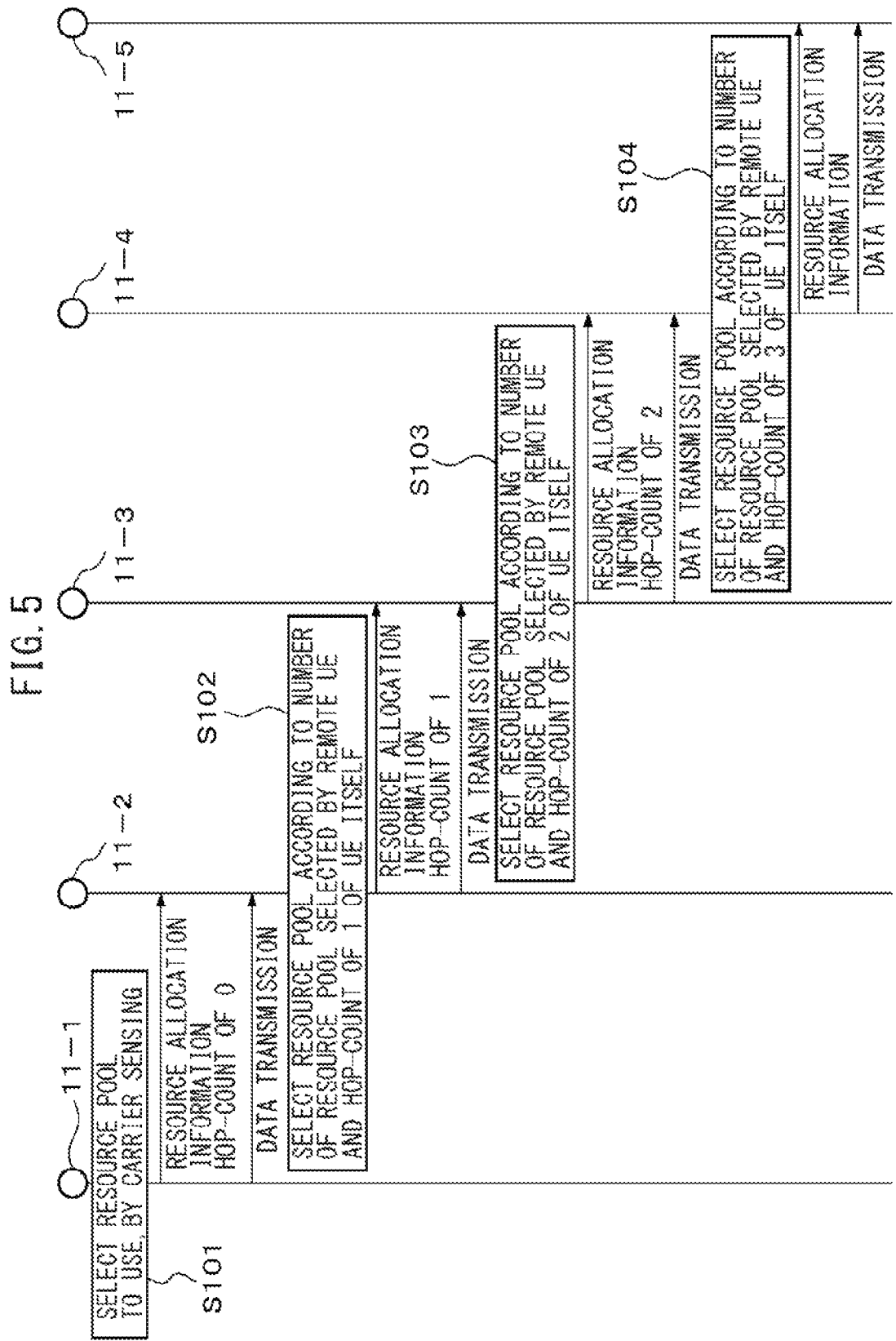

USER EQUIPMENT, BASE STATION, RADIO COMMUNICATION SYSTEM, AND RADIO COMMUNICATION METHOD

CROSS-REFERENCE TO RELATED APPLICATION

This application is a continuation application of International Application PCT/JP2016/061845 filed on Apr. 12, 2016 and designated the U.S., the entire contents of which are incorporated herein by reference.

FIELD

The present invention relates to, for example, a radio communication system in which a user equipment (UE) relays communication between other user equipments, or communication between another user equipment and an evolved Node B (eNB), and a radio communication method, a user equipment, and a base station which are utilized in such a radio communication system.

BACKGROUND

A communication scheme (Device to Device, D2D) for performing direct communication between UEs without passing eNB in mobile communication systems is discussed. Such a communication scheme is specified in Long Term Evolution, Release 12 which is a telecommunications standard standardized by Third Generation Partnership Project (3GPP).

In D2D communication, a UE transmits data and control information by the use of a resource selected from a resource pool. A resource represents time and frequency which can be assigned when a UE transmits a control signal or data within a channel with a predetermined period and a frequency band which are specified in D2D communication. The resource pool includes a plurality of such resources.

In particular, for a UE (Out-of-coverage UE) located outside a cell provided by an eNB, a set of resource pools for data transmission and a set of resource pools for sidelink control are configured in advance in a UE. Note that these pre-configured sets of resource pools are installed in a UE, for example, at the time of factory shipments.

In the set of resource pools for data transmission, the resource pool described at a head of a list in which the sets of the resource pools are presented is used for both data transmission and reception, whereas other resource pools are used only for data reception. Similarly, also in the set of resource pools for sidelink control, the resource pool described at a head of a list in which the sets of the resource pools are presented is used for both transmission and reception of sidelink control, whereas other resource pools are used only for sidelink control reception.

Examples of the related art include a Non Patent Literature (J. Schlienz et al. "Device to Device communication in LTE Whitepaper", ROHDE&SCHWARZ).

SUMMARY

According to one embodiment, a radio communication system including a plurality of communication devices is provided. In the radio communication system, each of the plurality of communication devices stores a common set of resource pools including a plurality of resources each of which specifies frequency and time usable for radio communication with another communication device among the plurality of communication devices. A first communication device among the plurality of communication devices selects a resource pool from the set of resource pools, and transmits a signal addressed to a second communication device among the plurality of communication devices by the use of a resource included in the selected resource pool. On the other hand, one or more third communication devices each of which relays the radio communication between the first communication device and the second communication device among the plurality of communication devices select a resource pool from the set of resource pools in accordance with a predetermined rule which is defined on the basis of a hop count at the third communication device in the radio communication between the first communication device and the second communication device and the resource pool selected by the first communication device, and transfers the signal addressed to the second communication device by the use of a resource included in the selected resource pool to a next communication device in a relay order among the one or more third communication devices or the second communication device.

According to another embodiment, a user equipment which relays radio communication between a first another user equipment and a second another user equipment is provided. The user equipment includes: a storage unit which stores a set of resource pools including a plurality of resources each of which specifies frequency and time usable by the user equipment for radio communication with the second another communication device; and a control unit which selects a resource pool from the set of resource pools in accordance with a predetermined rule which is defined on the basis of a hop count at the user equipment in the radio communication between the first another user equipment and the second another user equipment and a resource pool selected by the first another communication device from the set of resource pools, and relays the radio communication between the first another user equipment and the second another user equipment by the use of a resource included in the selected resource pool.

According to still another embodiment, a base station which performs radio communication with each of a plurality of user equipments via at least another user equipment is provided. The base station includes: a storage unit which stores a set of resource pools including a plurality of resources each of which specifies frequency and time usable by each of the plurality of user equipments for radio communication with the at least another user equipment; and a control unit which sets a resource pool to be used by the user equipment from the set of resource pools for each of the plurality of user equipments, on the basis of parameters each indicating a state of the user equipment notified from each of the plurality of user equipments, and notifies each of the plurality of user equipments of the set resource pool via the at least another user equipment.

According to yet another embodiment, a radio communication method in a radio communication system which includes a plurality of communication devices is provided. The radio communication method includes: selecting, by a first communication device among the plurality of communication devices, a resource pool from a set of resource pools which are stored in each of the plurality of communication devices and include a plurality of resources each of which specifies frequency and time usable for radio communication with another communication device among the plurality of communication devices, and transmitting a signal addressed to a second communication device among the plurality of communication devices by the use of a resource included in the selected resource pool, an selecting, by one or more third communication devices each of which relays the radio communication between the first communication device and the second communication device, among the plurality of communication devices, a resource pool from the set of resource pools in accordance with a predetermined rule which is defined on the basis of a hop count at the third communication device in the radio communication and the resource pool selected by the first communication device, and transferring the signal addressed to the second communication device by the use of a resource included in the selected resource pool to a next communication device in a relay order among the one or more third communication devices or the second communication device.

BRIEF DESCRIPTION OF DRAWINGS

FIG. 3A is a diagram illustrating an example of resource pools selected by respective user equipments (UEs) in accordance with a conventional technique in tree-structured device-to-device (D2D) links.

FIG. 3B is a diagram illustrating an example of resource pools selected by the respective UEs in accordance with this embodiment in the same D2D links as the tree-structured D2D links illustrated in FIG. 3A.

FIG. 5 is a sequence diagram of D2D communication in a wireless communication system 1 according to this embodiment.

DESCRIPTION OF EMBODIMENT

In D2D communication, when a distance between a UE on a transmission side (hereinafter referred to as a remote UE) and a UE on a reception side (hereinafter referred to as a destination UE) is long, the two UEs may not perform direct communication. It is discussed that, in such a case, one or more UEs (hereinafter referred to as relay UEs) located between the remote UE and the destination UE relay D2D communication.

It is assumed that, when one or more relay UEs relay D2D communication, a resource allocation in each UE is performed in accordance with the resource allocation for a case in which each UE is located outside a coverage of a cell, as defined in Release 12. In this case, each relay UE individually selects a resource to use at random. Therefore, when two relay UEs select the same resource, collision or interference may occur. In particular, since only one resource pool is usable for both transmission and reception of data according to Release 12 as described above, each relay UE selects a resource to use from the same resource pool. Therefore, a possibility of occurrence of collision and interference becomes higher as the number of the links of D2D communication increases, i.e. as the number of relay UEs increases.

In one aspect, an object of the present invention is to provide a radio communication system which can reduce occurrence of collision and interference when one or more UEs relay D2D communication.

A wireless communication system is described below with reference to the drawings.

In this wireless communication system, a remote user equipment (UE) located outside a cell of an evolved Node B (eNB) and a destination UE perform device-to-device (D2D) communication via one or more relay UEs. In this communication, it is possible to use multiple resource pools shared by the UEs, for both transmission and reception of data and sidelink control. The remote UE performs carrier sensing to detect an idling resource pool and performs transmission of data and sidelink control by the use of any of the resources in the detected resource pool. Each relay UE, meanwhile, selects a resource pool that the UE itself is to use, on the basis of the number of the resource pool used by the remote UE, as well as a predetermined rule indicating the relationship between the hop-count of the relay UE and the resource pool to be selected. With this configuration, it is possible to reduce the possibility that the remote UE and the relay UEs select the same resource, consequently reducing the occurrence of collision and interference.

The wireless communication system according to this embodiment is a mobile communication system based on, for example, Long-Term Evolution-Advanced (LTE-Advanced). However, the wireless communication system according to this embodiment may be any of other various mobile communication systems in which UEs located outside a cell of an eNB can perform D2D communication via one or more relay UEs.

Figure 1:
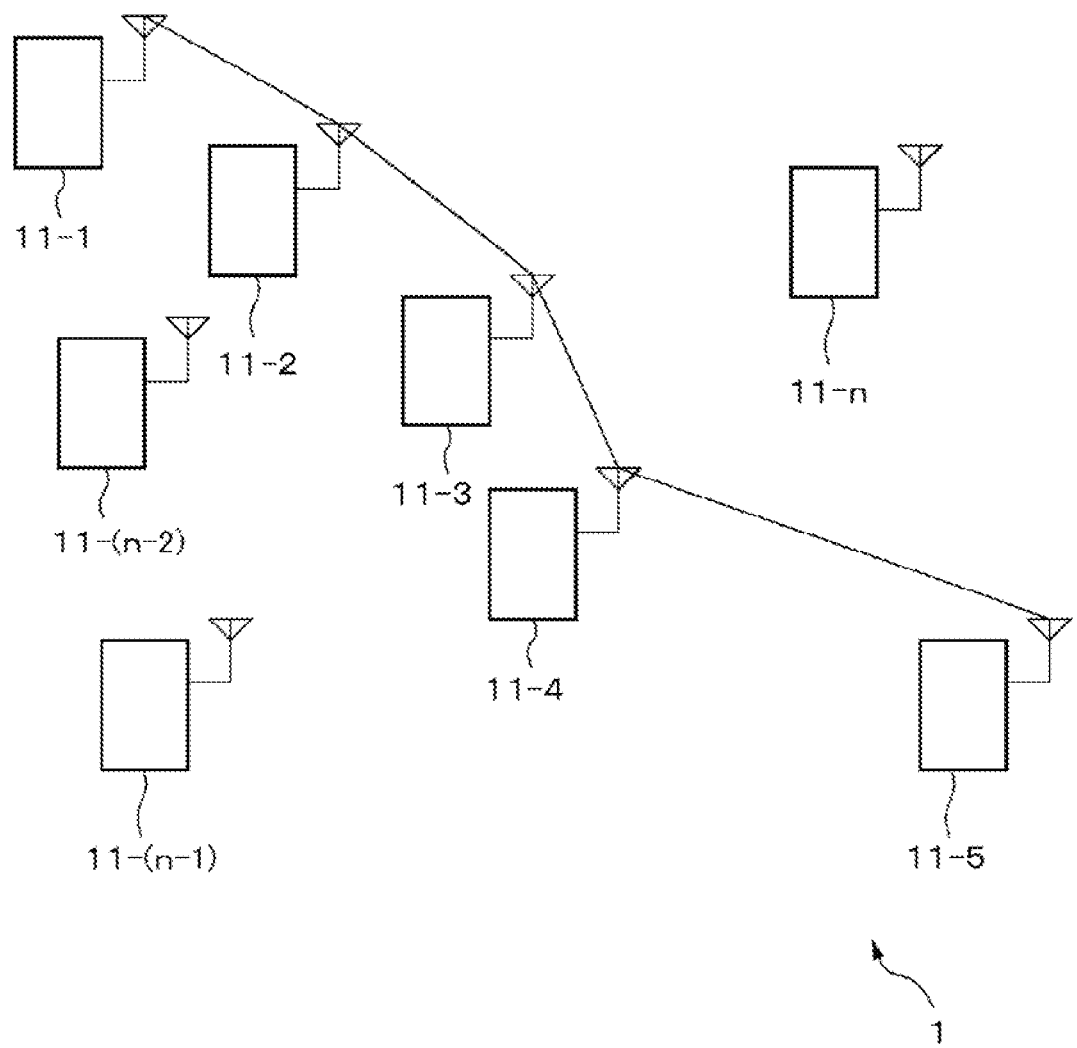
FIG. 1 is a schematic configuration diagram of a wireless communication system according to a first embodiment.

FIG. 1 is a schematic configuration diagram of a wireless communication system according to a first embodiment. A wireless communication system 1 includes multiple UEs 11-1 to 11-$n$ (where n is an integer larger than or equal to three). Each of the UEs is an example of a communication device. The wireless communication system 1 may also include an eNB (not illustrated) connected to a core network via an upper node (not illustrated).

In this embodiment, all the multiple UEs 11-1 to 11-$n$ are capable of D2D communication and can each operate as any of a remote UE, a destination UE, and a relay UE. The same set of resource pools is installed in advance in the UEs 11-1 to 11-$n$. In addition, all the resource pools included in the set of resource pools are usable for both transmission and reception of data or a sidelink control signal. In the following description, it is assumed that the UE 11-1 is a remote UE, the UE 11-5 is a destination UE, and each of the UEs 11-2 to 11-4 is a relay UE. All the UEs 11-1 to 11-5 may be located outside the range of the cell of the eNB (not illustrated), or either the UE 11-1, which is the remote UE, or the UE 11-5, which is the destination UE, may be included in the range of the cell.

The UE 11-1, which is the remote UE, discovers other UEs capable of D2D communication, in accordance with, for example, a predetermined discovery procedure. The UE 11-1 then determines a communication path for D2D communication to the UE 11-5, which is the destination UE, on the basis of the other UEs thus discovered.

When the communication path is determined, the UE 11-1 selects a resource to use for the communication to the next relay UE on the communication path, from among the multiple preinstalled resource pools. As described above, all the multiple preinstalled resource pools are usable for both transmission and reception of data or a sidelink control signal. Therefore, the UE 11-1 performs, for each resource pool, carrier sensing on each of the resources included in the resource pool, to thereby detect an unused resource pool, i.e., an idling resource pool. For example, the UE 11-1 performs carrier sensing based on energy detection. Specifically, the UE 11-1 calculates, for each resource, the average of the electric power detected in a predetermined time period. The UE 11-1 then compares, for each resource, the average of the detected electric power with a predetermined threshold value.

When the average of the electric power detected for any of the resources is larger than the predetermined threshold value, the resource pool including the resource is assumed to be dominantly used for D2D communication by a different UE or the like. In contrast, when the average of the electric power detected for each of the resources included in a target resource pool is smaller than or equal to the predetermined threshold value, the resource pool is assumed to be in an idling state, i.e., the resource poor is usable. Accordingly, the UE 11-1 selects a resource to use from the idling resource pool.

In a modified example, the UE 11-1 may perform, for each resource pool, carrier sensing on only some of the resources included in the resource pool, instead of performing carrier sensing on all the resources. For example, the UE 11-1 may perform, for each resource pool, carrier sensing on resources included in the resource pool, the resources indicating the median frequency, the maximum frequency, and the minimum frequency of the frequencies indicated by the resources. The UE 11-1 thus configured can reduce the computation amount and the like for the carrier sensing.

The UE 11-1 transmits data or a sidelink control signal to the next relay UE 11-2 by the use of the selected resource. For the transmission, the UE 11-1 transmits a synchronization signal, such as a primary/secondary sidelink synchronization signal (PSSS/SSSS), whereby the UE 11-1 and the relay UE 11-2 are synchronized. The UE 11-1 then notifies the next relay UE 11-2 of scheduling information, such as the resource to be used for data transmission, for example, through a physical sidelink control channel (PSCCH) defined in a predetermined cycle. In addition, the UE 11-1 includes the hop-count of the UE itself (zero for the UE 11-1) in predetermined control information and transmits the control information to the next relay UE 11-2. The predetermined control information may be formed, for example, by adding the hop-count to SCI format 0, which is specified in Release 12. The UE 11-1 then transmits data to the relay UE 11-2 via a physical sidelink shared channel (PSSCH) by the use of the selected resource.

Each of the relay UEs 11-2 to 11-4 receives data from the relay UE immediately before the relay UE itself, or the remote UE, and transfers the data further to the next relay UE or the destination UE.

Each of the relay UEs 11-2 to 11-4 receives the data by the use of the resource selected by the relay UE immediately before the relay UE itself, or the remote UE. Each of the relay UEs 11-2 to 11-4 selects a resource pool to use for data transfer to the next relay UE or the destination UE, on the basis of the hop-count of the relay UE itself and the number of the resource pool selected by the remote UE, in accordance with the predetermined rule.

Figure 2:
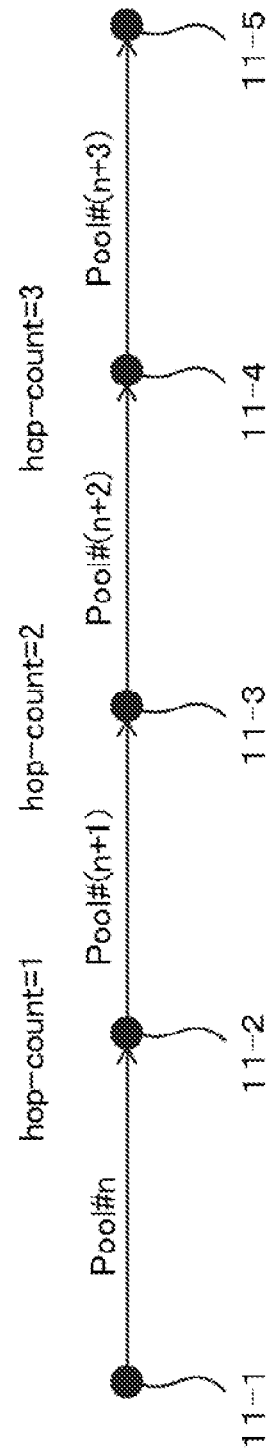
FIG. 2 is a diagram illustrating an example of relationship between hop-counts and selected resource pools.

FIG. 2 is a diagram illustrating an example of the relationship between hop-counts and resource pools to be selected. In FIG. 2, arrows indicate the order of the UEs to which data is transferred. Specifically, in this example, data is transferred in the order of: the UE 11-1, UE 11-2, UE 11-3, UE 11-4, and then UE 11-5. Accordingly, the hop-counts of the UE 11-2, the UE 11-3, and the UE 11-4 are one, two, and three, respectively.

In this example, it is specified, as the predetermined rule, that the each relay UE determines the resource pool having the number corresponding to the total of the number of the resource pool selected by the remote UE 11-1 and the hop-count of the relay UE, as the resource pool to be selected by the relay UE. When the total is larger than the largest value of the numbers of the resource pools, the resource pool having the number obtained by subtracting the largest value of the numbers of the resource pools from the total is determined as the resource to be selected by the relay UE. In the example presented in FIG. 2, the remote UE 11-1 selects the n-th resource pool, and hence, the UE 11-2 having the hop-count of "1" selects the (n+1)-th resource pool. Similarly, the UE 11-3 having the hop-count of "2" selects the (n+2)-th resource pool, and the UE 11-4 having the hop-count of "3" selects the (n+3)-th resource pool. In other words, the resource pool selected by each relay UE is the resource pool having the number obtained by adding one to the number of the resource pool to which the resource used by the relay UE immediately before the relay UE itself or the remote UE belongs. In this way, even when each relay UE is not notified of the number of the resource pool selected by the remote UE, the relay UE can select a resource pool in accordance with the above-described rule.

Note that the predetermined rule is not limited to the above-described example. For example, it may be specified, as the predetermined rule, that each relay UE determines the resource pool having the number corresponding to the value obtained by subtracting the hop-count of the relay UE from the number of the resource pool selected by the remote UE 11-1, as the resource pool to be selected by the relay UE. In this case, in the example illustrated in FIG. 2, the number of the resource pool selected by the relay UE 11-2 is (n−1), the number of the resource pool selected by the relay UE 11-3 is (n−2), and the number of the resource pool selected by the relay UE 11-4 is (n−3). However, when the number of the resource pool calculated on the basis of the rule is smaller than or equal to zero, the number corresponding to the value obtained by adding the largest value of the numbers of the resource pools to the calculated number may be determined as the number of the resource pool to be selected. Hence, the predetermined rule may be defined so that resource pools having different numbers are selected at least for the respective relay UEs having consecutive hop-counts.

Each relay UE transfers the data received from the relay UE immediately before the UE itself or the remote UE, to the next relay UE or the destination UE, by the use of any one of the resources belonging to the resource pool selected by the relay UE itself. For the transfer, each relay UE may transfer the data in a procedure similar to that employed by the remote UE 11-1. Each relay UE may transfer the data in a relay scheme for any of Layer 1 to Layer 3. Moreover, each relay UE, as the UE 11-1, includes the hop-count of the relay UE itself in predetermined control information and transmits the control information to the next relay UE.

The remote UE and each relay UE may select a resource pool to use, in a procedure similar to that described above, also for a sidelink control signal for D2D communication to be transmitted and received via a PSCCH.

Description is given below, by taking typical D2D links as an example, of the probability at which collision or interference occurs when a resource pool is selected in a conventional technique and the probability at which collision or interference occurs when a resource pool is selected according to this embodiment.

FIG. 3A is a diagram illustrating an example of resource pools selected by respective UEs in a conventional technique in the case of tree-structured D2D links. FIG. 3B is a diagram illustrating an example of resource pools selected by the respective UEs according to this embodiment in the case of the D2D links same as the tree-structured D2D links presented in FIG. 3A.

In FIG. 3A and FIG. 3B, D1 to D11 represent UEs. Each arrow represents a link between corresponding UEs, and the UE at the base of each arrow transmits data while the UE at the tip of the arrow receives the data. The numerical value provided near each arrow indicates the number of the resource pool used in the D2D communication represented by the corresponding arrow. In this example, the number of resource pools installed in each UE is assumed to be four.

In the conventional technique, the resource pool usable for both transmission and reception of data is only the first resource pool. Accordingly, in each D2D communication, the first resource pool is used as illustrated in FIG. 3A. In this case, for example, the interference possible to occur in the UE D3 at radio waves used for data communication from the UE D7 is expressed by the following equation.

$$I_{D3} = I_{4,3} + I_{5,3} + I_{6,3} \quad (1)$$

$$I_{i,j} = \frac{P_{tx,i}}{d_{i,j}^\alpha}$$

Wherein, $P_{tx,i}$ represents the transmission power of the UE Di (i=1, 2, . . . , 11). Moreover, represents the distance between the UE Di and the UE Dj (j=1, 2, . . . , 11, where i is not equal to j). Further, a represents a transmission loss index. Note that no interference is assumed to occur in the UE D3 at radio waves from each UE (D8, D9) having the number of links from the UE D3 larger than three, since the UE is distant from the UE D3. It is also assumed that each relay UE uses a resource different from that used for reception of data from the UE immediately before the UE itself.

Similarly, interference possible to occur in the UE D1 at radio waves used for data communication from the UE D3 is expressed by the following equation.

$$I_{D1}=I_{2,1}+I_{8,1}+I_{9,1}+I_{10,1}+I_{11,1} \quad (2)$$

In contrast, according to this embodiment as illustrated in FIG. 3B, the remote UE selects a resource pool determined as being in an idling state from among multiple resource pools as a result of carrier sensing and uses, for D2D communication, any one of the resources included in the resource pool. Each relay UE selects a resource pool on the basis of the number of the resource pool selected by the remote UE and the hop-count of the relay UE itself. Accordingly, different resource pools are used for adjacent links as illustrated in FIG. 3B. For example, focus, as in the above case, on data communication in the UE D3 from the UE D11 via the UE D7. In this case, the resource pool "1" used for this data communication is different from any of the resource pools used by the UEs D4, D5, and D6 that transmitted radio waves at which interference is possible to occur in the conventional technique. Hence, no interference occurs in this data communication.

Next, focus on the data communication in the UE D1 from the UE D11 via the UE D7 and the UE D3. In this case, only the UE D2 uses the same resource pool as the resource pool "2" used for this data communication among the UEs D2, D8, D9, D10, and D11 that transmitted the radio waves at which interference is possible to occur in the conventional technique. Hence, the interference possible to occur at the radio waves used for this data communication is $I_{9,1}$.

Figure 4A:
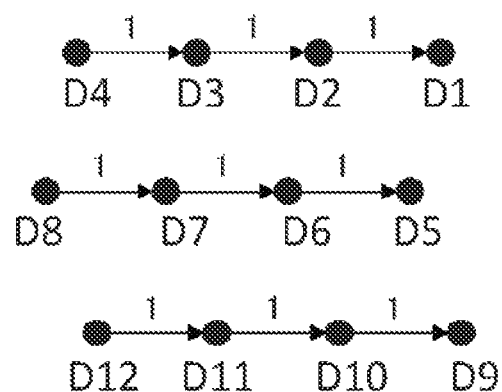
FIG. 4A is a diagram illustrating an example of resource pools selected by respective UEs in accordance with the conventional technique in linear D2D links.
Figure 4B:
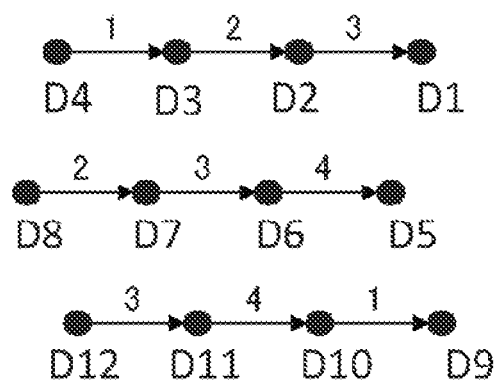
FIG. 4B is a diagram illustrating an example of resource pools selected by the respective UEs in accordance with this embodiment in the linear D2D links.

FIG. 4A is a diagram illustrating an example of resource pools selected by respective UEs in linear D2D links in a conventional technique. FIG. 4B is a diagram illustrating an example of resource pools selected by respective UEs in the linear D2D links according to this embodiment.

In FIG. 4A and FIG. 4B, D1 to D12 represent UEs. Each arrow represents a link between corresponding UEs, and the UE at the base of each arrow transmits data while the UE at the tip of the arrow receives the data. The numerical value provided near each arrow indicates the number of the resource pool used in the D2D communication represented by the corresponding arrow. In this example, the number of resource pools installed in each UE is assumed to be four.

In the conventional technique, the resource pool usable for both transmission and reception of data is only the first resource pool. Accordingly, the first resource pool is used in each D2D communication as illustrated in FIG. 4A. Hence, for example, the interference possible to occur in the UE D9 at the radio waves used for the data communication from the UE D10 is expressed by the following equation.

$$I_{D9}=I_{4,9}+I_{8,9}+I_{12,9}+I_{2,9}+I_{6,9} \quad (3)$$

Wherein, it is assumed that the UEs D3, D7, and D11 only perform data reception while the UEs D4, D8, and D9 are transmitting data.

In contrast, according to this embodiment as illustrated in FIG. 4B, the remote UE selects a resource pool determined as being in an idling state from among multiple resource pools as a result of carrier sensing and uses, for D2D communication, any one of the resources included in the resource pool. Each relay UE selects a resource pool on the basis of the number of the resource pool selected by the remote UE and the hop-count of the relay UE itself. Accordingly, different resource pools are used for adjacent links as illustrated in FIG. 4B. For example, focus, as in the above case, on data communication in the UE D9 from the UE D10. In this case, only the UE D4 uses the same resource pool as the resource pool "1" used for this data communication among the UEs D4, D8, D8, D12, D2, and D6 that transmitted radio waves at which interference is possible to occur in the conventional technique. Accordingly, the interference possible to occur at the radio waves used for this data communication is $I_{4,9}$.

In the example presented in FIG. 4A, since each UE selects a resource from the first resource pool, the probability at which collision occurs at each linear D2D link is expressed by the following expression.

$$1 - \frac{N_{rp} \times (N_{rp} - 1) \times (N_{rp} - 2)}{N_{rp} \times N_{rp} \times N_{rp}} = \frac{3N_{rp} - 2}{N_{rp} \times N_{rp}} \quad (4)$$

Wherein, $N_{rp}$ represents the number of resources included in a single resource pool. In contrast, in this embodiment, different resource pools are selected for respective UEs in the linear D2D links, accordingly no collision occurs.

It is understood, as described above, the probability at which interference or collision occurs is reduced for both types of D2D links in this embodiment compared with the conventional technique.

FIG. 5 is a sequence diagram of D2D communication in the wireless communication system 1 according to this embodiment.

First, the remote UE 11-1 performs carrier sensing on each resource pool to thereby detect one or more idling resource pools, and selects a resource pool to use from among the detected idling resource pools (Step S101). The remote UE 11-1 then transmits resource allocation information and a hop-count of "0" of the remote UE 11-1 to the first relay UE 11-2. Thereafter, the remote UE 11-1 transmits data by the use of the resource indicated by the resource allocation information.

The relay UE 11-2 receives data transmitted by the use of the specified resource with reference to the resource allocation information. In addition, the relay UE 11-2 calculates a hop-count of "1" for the UE itself on the basis of the notified hop-count. The relay UE 11-2 selects a resource pool to be used for data transfer on the basis of the number of the resource pool selected by the remote UE 11-1 and the hop-count of "1" of the UE itself in accordance with the predetermined rule (Step S102). The relay UE 11-2 then transmits the resource allocation information and the hop-count of "1" of the relay UE 11-2 to the next relay UE 11-3. Thereafter, the relay UE 11-2 transmits the data by the use of the resource indicated by the resource allocation information.

The relay UE 11-3 receives the data transferred by the use of the specified resource with reference to the resource allocation information. In addition, the relay UE 11-3 calculates a hop-count of "2" for the UE itself on the basis of the notified hop-count. The relay UE 11-3 selects a resource pool to be used for data transfer on the basis of the number of the resource pool selected by the remote UE 11-1 and the hop-count of "2" of the UE itself in accordance with the predetermined rule (Step S103). The relay UE 11-3 then transmits the resource allocation information and the hop-count of "2" of the relay UE 11-3 to the next relay UE 11-4. Thereafter, the relay UE 11-3 transfers the data by the use of the resource indicated by the resource allocation information.

Similarly, the relay UE 11-4 receives the data transferred by the use of the specified resource with reference to the resource allocation information. In addition, the relay UE 11-4 calculates a hop-count of "3" for the UE itself on the basis of the notified hop-count. The relay UE 11-4 selects a resource pool to be used for data transfer on the basis of the number of the resource pool selected by the remote UE 11-1 and the hop-count of "3" of the UE itself in accordance with the predetermined rule (Step S104). The relay UE 11-4 then transmits the resource allocation information to the destination UE 11-5. Thereafter, the relay UE 11-4 transfers the data by the use of the resource indicated by the resource allocation information.

In the above way, data is transmitted from the remote UE 11-1 to the destination UE 11-5.

Detailed description is given below of the UEs included in the wireless communication system 1 according to this embodiment. In this embodiment, the UEs included in the wireless communication system 1 may have the same configuration. In view of this, the UE 11-1 is described below.

Figure 6:
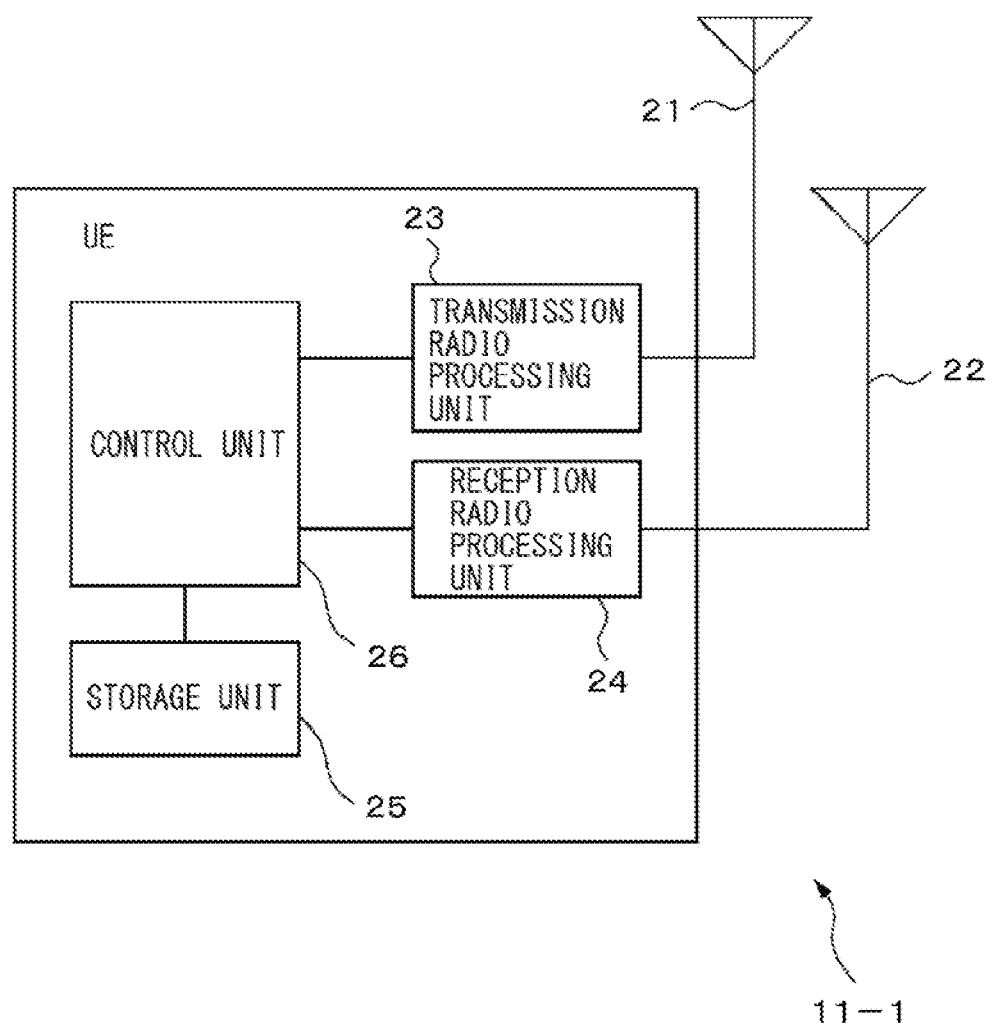
FIG. 6 is a schematic configuration diagram of a UE.

FIG. 6 is a schematic configuration diagram of the UE 11-1. The UE 11-1 includes a transmission antenna 21, a reception antenna 22, a transmission radio processing unit 23, a reception radio processing unit 24, a storage unit 25, and a control unit 26. The transmission radio processing unit 23, the reception radio processing unit 24, the storage unit 25, and the control unit 26 are formed as separate circuits. Alternatively, these units may be mounted in the UE 11-1 as one or multiple integrated circuits in which circuits corresponding to the units are integrated.

The transmission antenna 21 transmits, as a radio signal, an uplink signal transferred via the transmission radio processing unit 23 or any of various kinds of transmission signals in D2D communication.

The reception antenna 22 receives a downlink signal, which is a radio signal from the eNB, converts the downlink signal to an electric signal, and transfers the downlink signal, which is converted to the electric signal, to the reception radio processing unit 24. The reception antenna 22 also receives various kinds of radio signals in D2D communication from other UEs, converts each received radio signal to an electric signal, and transfers the converted signal to the reception radio processing unit 24.

The transmission radio processing unit 23 converts a multiplexed transmission signal (e.g., an uplink signal or any of various signals in D2D communication) received from the control unit 26 into an analog signal, and then superimposes the signal on a carrier wave having a radio frequency specified by the control unit 26. The transmission radio processing unit 23 then amplifies the uplink signal superimposed on the carrier wave to a predetermined level by a high-power amplifier (not illustrated) and transfers the signal to the transmission antenna 21.

The reception radio processing unit 24 amplifies the signal (e.g., a downlink signal or any of various signals in D2D communication) received from the reception antenna 22 by a low-noise amplifier (not illustrated). The reception radio processing unit 24 multiplies the amplified signal by a cyclic signal having an intermediate frequency, to thereby convert the frequency of the amplified signal from the radio frequency to a baseband frequency. The reception radio processing unit 24 then performs analog-to-digital conversion on the signal having the baseband frequency and transfers the obtained signal to the control unit 26.

The storage unit 25 includes, for example, a rewritable nonvolatile semiconductor memory or volatile semiconductor memory. The storage unit 25 stores various kinds of information for communications with the eNB, various kinds of information that the UE 11-1 transmits or receives, various programs run in the UE 11-1, and the like. The storage unit 25 also stores various kinds of information to be used in D2D communication, such as the set of resource pools.

The control unit 26 includes, for example, one or multiple processors and peripheral circuits of the processors. The control unit 26 performs a process such as error-correction coding on uplink signals. The control unit 26 further modulates the uplink signals according to a predetermined modulation method and multiplexes the signals. A multiplexing method to be used may be, for example, single carrier frequency division multiplexing (SC-FDMA). The control unit 26 transfers the modulated and multiplexed uplink signal to the transmission radio processing unit 23.

The control unit 26 also demultiplexes the downlink signal received from the reception radio processing unit 24, in a predetermined multiplexing method, demodulates the demultiplexed downlink signals, and performs error-correction decoding on the demodulated signals. A multiplexing method to be performed on the downlink signals may be, for example, orthogonal frequency-division multiplexing (OFDM). The control unit 26 extracts an audio signal, a video signal, or data from the decoded downlink signals. The control unit 26 regenerates the extracted audio signal by the use of a speaker (not illustrated) or displays the video signal or data on a display (not illustrated).

In addition to the above, the control unit 26 carries out various processes for performing wireless communication, such as transmission power control and sidelink control.

The control unit 26 also carries out various processes for performing D2D communication.

Figure 7:
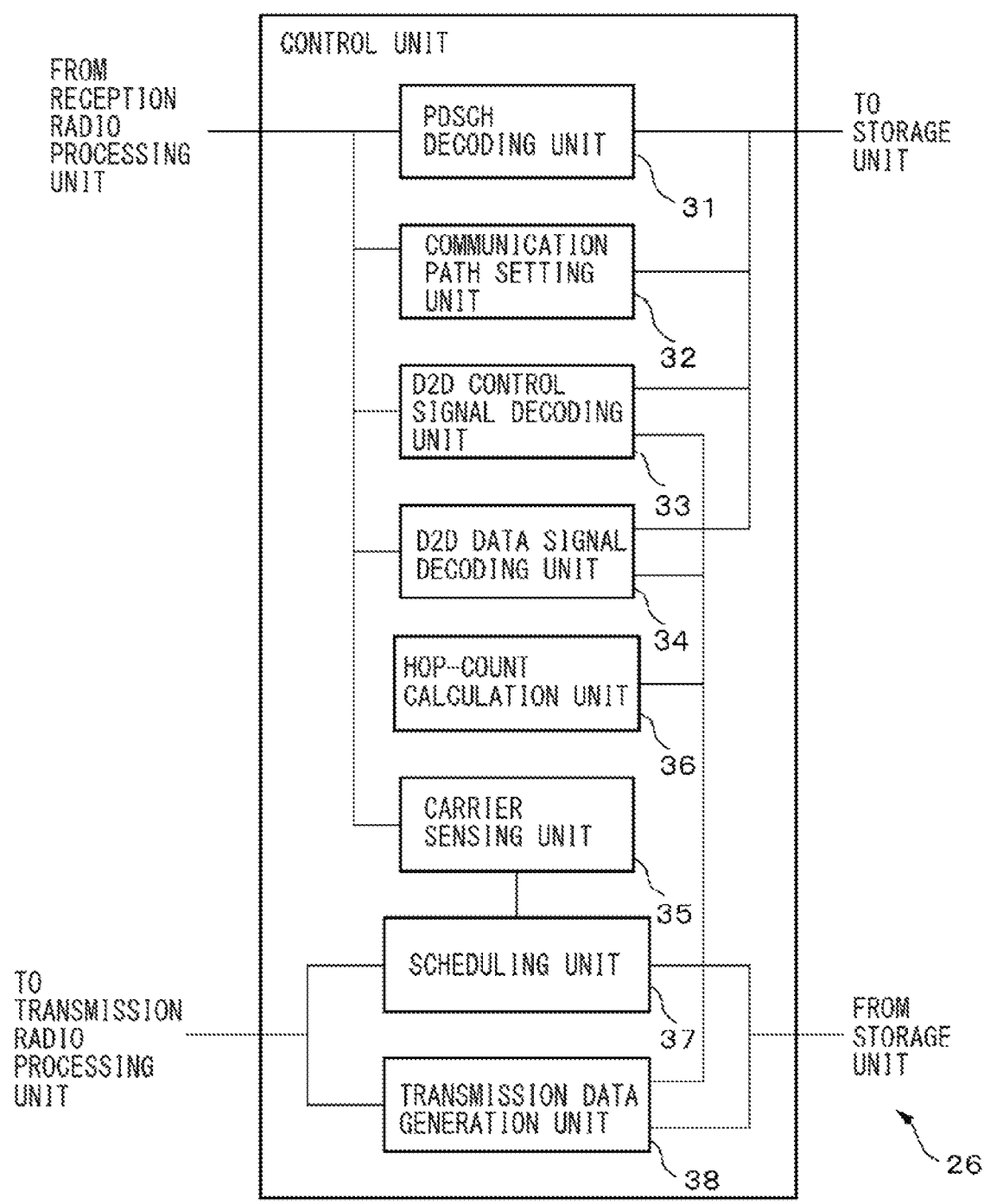
FIG. 7 is a functional block diagram of a control unit related to D2D communication.

FIG. 7 is a functional block diagram of the control unit 26 related to D2D communication. The control unit 26 includes a PDSCH decoding unit 31, a communication path setting unit 32, a D2D control signal decoding unit 33, a D2D data signal decoding unit 34, a carrier sensing unit 35, a hop-count calculation unit 36, a scheduling unit 37, and a transmission data generation unit 38. These units included in the control unit 26 are implemented by a computer program configured to operate on a processor included in the control unit 26. Alternatively, the units included in the control unit 26 may be mounted in the UE 11-1 as one or multiple integrated circuits in which circuits corresponding to the units are integrated.

When the UE 11-1 is located in the cell of the eNB, the PDSCH decoding unit 31 decodes a physical downlink shared channel (PDSCH) signal included in a downlink signal from the eNB. The PDSCH decoding unit 31 also extracts a set of resource pools to be used when the UE 11-1 is located in the cell of the eNB, from the decoded signal, and stores the set of resource pools in the storage unit 25.

The communication path setting unit 32 identifies, for example, a communication path to a destination UE and the relay UEs existing on the communication path. For the identification, the communication path setting unit 32 carries out a discovery process, to thereby detect other UEs located near the UE 11-1. The discovery process itself may be one based on LTE Release 12. For example, the communication path setting unit 32 generates various transmission signals to be used in the discovery process, for example, a discovery message, such as a discovery request message or a discovery response message. The communication path setting unit 32 outputs the transmission signal to the transmission radio processing unit 23. The communication path setting unit 32 also decodes the signal included in a signal received from the reception radio processing unit 24 and related to the discovery process from a different UE.

When the UE 11-1 is a remote UE, the communication path setting unit 32 generates a discovery message including identification information of a destination UE and transmits the discovery message via the transmission radio processing unit 23 and the transmission antenna 21. With reference to information on the measured value of received power included in a discovery response message from each of one or more UEs responded to the discovery message, the communication path setting unit 32 determines the UE having the highest received power as the first relay UE. The communication path setting unit 32 generates a control signal including information indicating that the UE is specified as a relay UE and transmits the control signal to the first relay UE via the transmission radio processing unit 23 and the transmission antenna 21.

When the received discovery response message includes identification information of each relay UE located on the path to the destination UE and the identification information of the destination UE, the communication path setting unit 32 identifies a communication path to the destination UE on the basis of the identification information. The communication path setting unit 32 stores, in the storage unit 25, the identification information of each UE on the communication path and the order of the UEs for the communication to be performed.

In contrast, when the UE 11-1 is not a remote UE, the communication path setting unit 32 measures, upon receipt of a discovery request message from a UE located near the UE 11-1, the received power of radio wave from the UE. The communication path setting unit 32 then generates a discovery response message including information on the measured value of the received power and the identification information of the UE 11-1, and responds to the UE with the discovery response message via the transmission radio processing unit 23 and the transmission antenna 21.

Upon receipt of control information indicating that the UE is specified to be a relay UE, the communication path setting unit 32 generates a discovery message including the identification information of the remote UE, the identification information of the UE itself, and the identification information of the destination UE. The communication path setting unit 32 transmits the message to a UE located nearby, via the transmission radio processing unit 23 and the transmission antenna 21.

With reference to information on the measured value of received power included in a discovery response message from each of one or more UEs responded to the discovery message, the communication path setting unit 32 determines the UE having the highest received power as the next relay UE. The communication path setting unit 32 generates a control signal including information indicating that the UE is determined as a relay UE and transmits the control signal to the next relay UE via the transmission radio processing unit 23 and the transmission antenna 21. The communication path setting unit 32 transmits a control signal including identification information of each of the UE itself and the relay UEs subsequent to the UE itself, to the relay UE immediately before the UE itself or the remote UE, via the transmission radio processing unit 23 and the transmission antenna 21.

A similar process is repeated until a communication path from the remote UE to the destination UE is established.

The D2D control signal decoding unit 33 decodes a control signal received from a different UE (e.g., the remote UE or the relay UE immediately before the UE itself) in D2D communication, included in a signal received via the reception radio processing unit 24, and transmitted via, for example, a PSCCH. The control signal also includes, for example, a signal that is modified so as to include a hop-count and is based on SCI Format 0, and schedule allocation information. The D2D control signal decoding unit 33 extracts the hop-count from SCI Format 0 and notifies the hop-count calculation unit 36 of the hop-count. The D2D control signal decoding unit 33 extracts the schedule allocation information from the control signal and transfers the information to the D2D data signal decoding unit 34.

The D2D data signal decoding unit 34 decodes a signal in D2D communication received via the reception radio processing unit 24. In the decoding, the D2D data signal decoding unit 34 determines the signal corresponding to the resource specified by the schedule allocation information, as a signal to the UE itself or a signal that the UE itself relays.

When the UE 11-1 is a remote UE, the carrier sensing unit 35 performs carrier sensing on each of the resources included in the set of resource pools configured in advance, in order to determine a resource to use. As described above, the carrier sensing unit 35 calculates, for each resource, the average of the electric power detected in a certain time period. The carrier sensing unit 35 then compares, for each resource, the average of the detected electric power with the predetermined threshold value.

The carrier sensing unit 35 detects a resource pools having all the averages of the detected power for all resources included in the resource pool are equal to or smaller than the predetermined threshold value, i.e., an idling resource pools, and notifies the scheduling unit 37 of the number of the detected resource pool.

The hop-count calculation unit 36 increments, by one, the hop-count of the relay UE immediately before the UE itself or the remote UE received from the D2D control signal decoding unit 33. The hop-count calculation unit 36 determines the incremented hop-count to be the hop-count of the UE itself. The hop-count calculation unit 36 notifies the scheduling unit 37 of the hop-count of the UE itself.

When the UE 11-1 is a remote UE, the scheduling unit 37 selects one of the resources included in the resource pool identified by the number of the resource pool notified by the carrier sensing unit 35, as a resource to be used in D2D communication. Any resource may be selected from the identified resource pool.

In contrast, when the UE 11-1 is a relay UE, the scheduling unit 37 selects a resource pool that the UE itself is to use, on the basis of the hop-count of the UE itself and the number of the resource pool selected by the remote UE, in accordance with the predetermined rule. The scheduling unit 37 selects one of the resources included in the selected resource pool, as a resource to be used in D2D communication. In this case, as in the above case, any resource may be selected from the identified resource pool.

The scheduling unit 37 also generates a control signal for D2D communication including the hop-count of the UE itself and schedule allocation information indicating the selected resource. The scheduling unit 37 transmits the control signal to the next relay UE or the destination UE via the transmission radio processing unit 23 and the transmission antenna 21.

The transmission data generation unit 38 generates a transmission signal including transmission data, in such a manner as to use the selected resource. The transmission data generation unit 38 transmits the transmission signal to the next relay UE or the destination UE via the transmission radio processing unit 23 and the transmission antenna 21. When the UE 11-1 is a relay UE, the transmission data generation unit 38 determines the data received from the remote UE or the relay UE immediately before the UE itself via the D2D data signal decoding unit 34, to be the transmission data to be included in the transmission signal.

As described above, when the UEs perform D2D communications without involving the eNB in this wireless communication system, each of the multiple resource pools configured in advance are usable for transmission and reception of data. The remote UE detects an idling resource pool through carrier sensing and uses one of the resources included in the detected resource pool, for data transmission. Meanwhile, each relay UE for relaying D2D communication selects a resource pool on the basis of the number of the resource pool selected by the remote UE and the hop-count of the UE itself, in accordance with the predetermined rule. In this way, this wireless communication system can reduce the probability at which the remote UE and the relay UEs use the same resource pool in D2D communications between UEs relayed by one or more relay UEs, consequently reducing the occurrence of interference and collision.

In a modified example, the hop-count of each relay UE may be included in a control signal of a discovery process notified by the remote UE in the discovery process. Each relay UE may be notified of the corresponding hop-count by the control signal being transferred via the relay UE.

Next, a wireless communication system according to a second embodiment is described. In this wireless communication system, a single relay UE relays communication between an eNB and each of multiple remote UEs.

Figure 8:
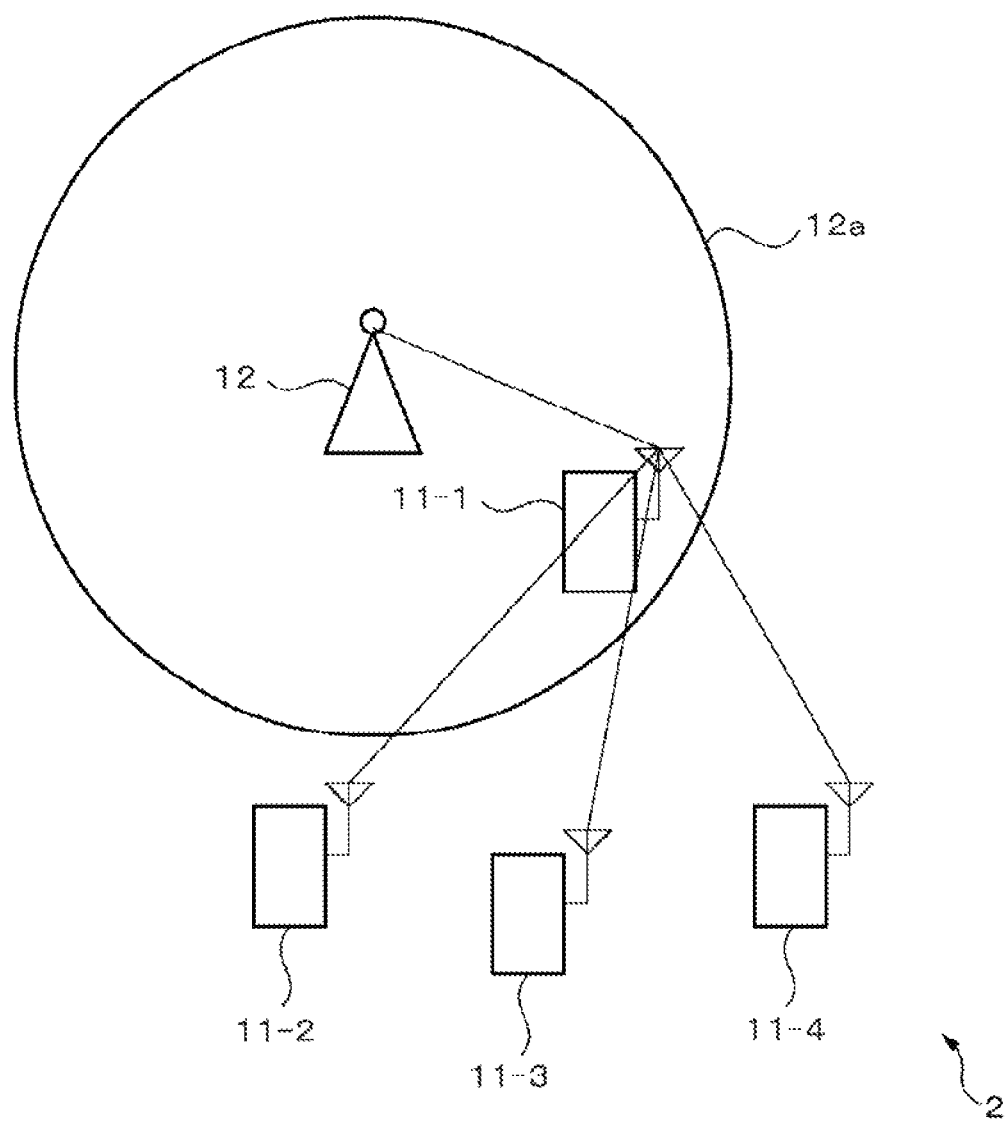
FIG. 8 is a schematic configuration diagram of a wireless communication system according to a second embodiment.

FIG. 8 is a schematic configuration diagram of the wireless communication system according to the second embodiment. A wireless communication system 2 according to the second embodiment includes multiple UEs 11-1 to 11-4 and an eNB 12. The eNB 12 is another example of a communication device.

In this embodiment, as in the above, all the multiple UEs 11-1 to 11-4 are capable of D2D communication and can each operate as any of a remote UE, a destination UE, and a relay UE. The same set of resource pools is installed in advance in the UEs 11-1 to 11-4. Any of the resource pools included in the set of resource pools is usable for both transmission and reception of data or a sidelink control signal. It is assumed below that the UE 11-1 is a relay UE and each of the UEs 11-2 to 11-4 is a remote UE. It is also assumed that the UE 11-1 is located within a cell 12a of the eNB 12 whereas all the UEs 11-2 to 11-4 are located outside the cell 12a.

In this embodiment, the hop-count of the UE 11-1 is "1" in D2D communication between the eNB 12 and each of the UEs 11-2 to 11-4. For this reason, when the UEs 11-2 to 11-4 select the same resource pool, the relay UE 11-1 configured to select a resource pool in a manner similar to the above-described embodiment selects the same resource pool for each D2D communication.

In view of this, in this embodiment, the eNB 12 selects a resource pool to be used by each remote UE so that different resource pools are to be allocated to the remote UEs 11-2 to 11-4.

For example, each of the remote UEs 11-2 to 11-4 includes a parameter representing the state of the UE, the parameter being to be used for selection of a resource pool, in a control signal of a discovery process to be transmitted to the relay UE 11-1. The parameter includes, for example, at least one of a parameter representing the environment of the UE itself, a parameter representing the communication state, and a parameter representing the degree of urgency of communication. The parameter representing the environment of the UE itself may include the location and the speed of the UE itself. The parameter representing the communication state may include a radio measurement result. The relay UE 11-1 transfers the parameters received from the remote UEs 11-2 to 11-4 to the eNB 12.

The eNB 12 sets resource pools to be allocated to the remote UEs 11-2 to 11-4 on the basis of the parameters representing the states of the respective remote UEs 11-2 to 11-4. The eNB 12 sets different resource pools for multiple remote UEs located within a certain distance, for example. Multiple remote UEs that are located within a certain distance and have the same speed have possibility of belonging to the same group. Accordingly, the eNB 12 may assign the same resource pool to multiple remote UEs located within the certain distance and having the same speed while assigning different resource pools to multiple remote UEs having the difference in speed larger than or equal to a predetermined value or located outside the certain distance. The eNB 12 may assign different resource pools to remote UEs from the one having the highest or lowest received power indicated by radio measurement results in order. When a parameter representing the state of a UE includes a parameter representing the degree of urgency of communication, the eNB 12 may assign resource pools to remote UEs from the one having the highest degree of urgency in order.

The eNB 12 can assign resource pools having an orthogonal relationship with each other to different remote UEs. Resource pools having an orthogonal relationship with each other each include, for example, a resource having an orthogonal relationship with a resource included in the other resource pool with respect to frequency. Single schedule allocation information can indicate resources at the same position in the respective resource pools and multiple resource pools orthogonal to each other. For this reason, the eNB 12 can make notification about resource pools to be used by the remote UEs, only by transmitting single schedule allocation information. This reduces the overhead of sidelink control from the relay UE 11-1 to each of the remote UEs 11-2 to 11-4.

The relay UE 11-1 can transfer data from the eNB 12 to each of remote UEs 11-2 to 11-4 within a single schedule allocation period. For the transfer, the relay UE 11-1 may assign destination identification information in the data link layer (layer 2) to each of the remote UEs 11-2 to 11-4 in a connection establishment period. Each of the remote UEs 11-2 to 11-4 can distinguish between received data in the data link layer and received data in the network layer (layer 3). When the remote UEs 11-2 to 11-4 have the common destination identification information in the data link layer, each of the remote UEs 11-2 to 11-4 may identify the remote UE to which received data is transmitted, with reference to the address in the network layer, e.g., the IP address.

In the second embodiment, as in the case of the relay UEs in FIG. 1, communication between each remote UE and the eNB may be relayed by multiple serial relay UEs. Each of the relay UEs, as in the first embodiment, may select a resource pool that the UE itself uses, on the basis of the hop-count of the UE itself and the number of the resource pool selected by the remote UE.

Figure 9:
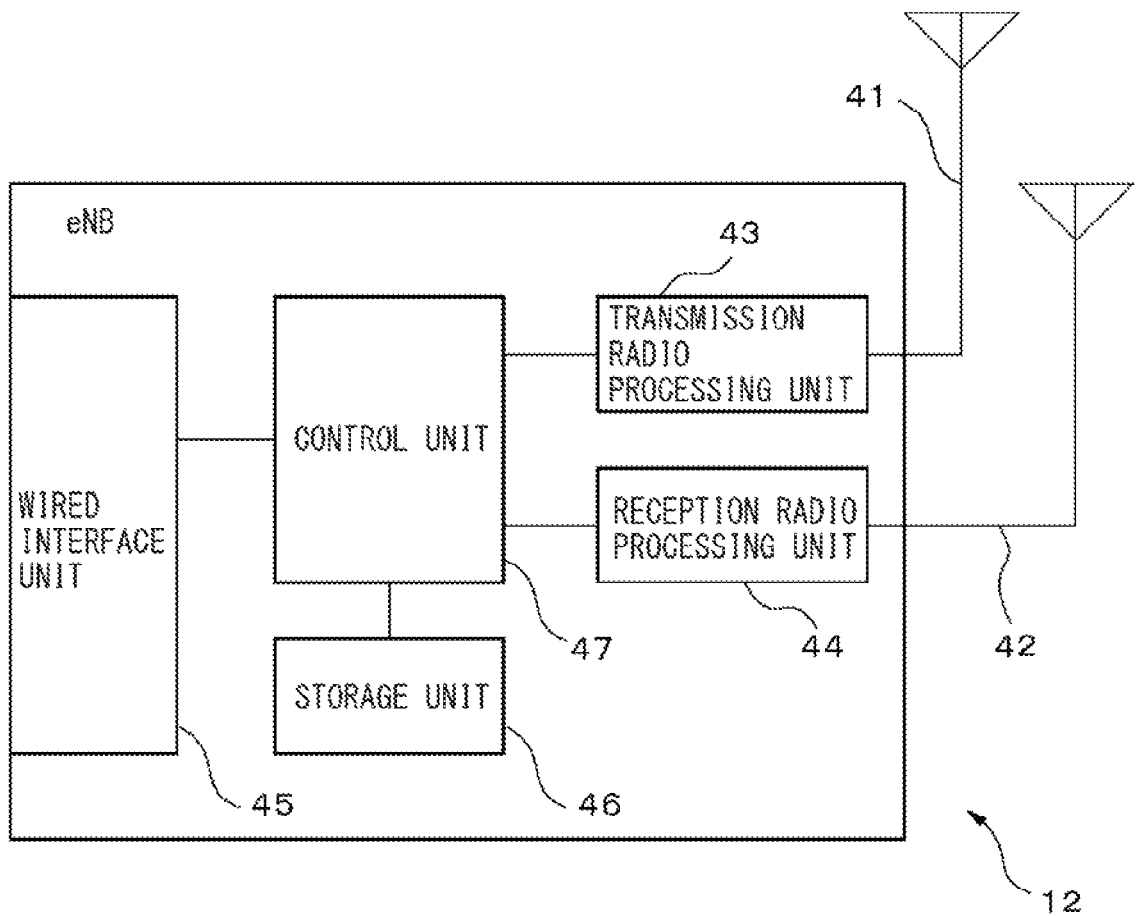
FIG. 9 is a schematic configuration diagram of an evolved Node B (eNB).

FIG. 9 is a schematic configuration diagram of the eNB 12. The eNB 12 includes a transmission antenna 41, a reception antenna 42, a transmission radio processing unit 43, a reception radio processing unit 44, a wired interface unit 45, a storage unit 46, and a control unit 47. The transmission radio processing unit 43, the reception radio processing unit 44, the wired interface unit 45, the storage unit 46, and the control unit 47 are formed as separate circuits. Alternatively, these units may be mounted in the eNB 12 as one or multiple integrated circuits in which circuits corresponding to the units are integrated.

The transmission antenna 41 transmits, as a radio signal, a downlink signal transferred via the transmission radio processing unit 43.

The reception antenna 42 receives an uplink signal, which is a radio signal from a UE, converts the uplink signal to an electric signal, and transfers the uplink signal converted to the electric signal, to the reception radio processing unit 44. The reception antenna 42 also receives various radio signals from other UEs in D2D communication, converts each received radio signal to an electric signal, and transfers the converted signal to the reception radio processing unit 44.

The transmission radio processing unit 43 converts a multiplexed downlink signal received from the control unit 47 to an analog signal, and then superimposes the analog signal on a carrier wave having a radio frequency specified by the control unit 47. The transmission radio processing unit 43 then amplifies the downlink signal superimposed on the carrier wave, to a desired level by a high-power amplifier (not illustrated) and transfers the signal to the transmission antenna 41.

The reception radio processing unit 44 amplifies an uplink signal received from the reception antenna 42 by a low-noise amplifier (not illustrated). The reception radio processing unit 44 multiplies the amplified uplink signal by a cyclic signal having an intermediate frequency, to thereby convert the frequency of the uplink signal from the radio frequency to a baseband frequency. The reception radio processing unit 44 then performs analog-to-digital conversion on the uplink signal having the baseband frequency and transfers the uplink signal to the control unit 47. This uplink signal includes a signal from any of the remote UEs 11-2 to 11-4 relayed by the relay UE 11-1.

The wired interface unit 45 includes a communication interface circuit for connecting the eNB 12 with an upper-node device (not illustrated) and other eNBs. The wired interface unit 45 analyzes a signal received from the upper-node device in accordance with an S1 interface, to thereby extract a downlink signal and a control signal included in the signal. The wired interface unit 45 also analyzes a signal received from each different eNB, in accordance with an X2 interface, to thereby extract a control signal included in the signal. The wired interface unit 45 transfers the downlink signal and the control signal thus extracted to the control unit 47.

The wired interface unit 45 also converts an uplink signal received from the control unit 47, to a signal in a format based on the S1 interface, and outputs the signal to the upper-node device. The wired interface unit 45 converts a control signal to be output to a different eNB, to a signal in a format based on the X2 interface. The wired interface unit 45 outputs the control signal to the different eNB.

The storage unit 46 includes, for example, a rewritable nonvolatile semiconductor memory or volatile semiconductor memory. The storage unit 46 stores various kinds of information for communications with UEs. In this embodiment, the storage unit 46 stores the same set of resource pools as that stored in each UE.

The control unit 47 includes, for example, one or multiple processors and peripheral circuits of the processors. The control unit 47 performs a process such as error-correction coding on downlink signals. The control unit 47 further modulates the downlink signals according to a predetermined modulation method and multiplexes the signals. A multiplexing method to be used may be, for example, OFDM. The control unit 47 transfers the modulated and multiplexed downlink signal to the transmission radio processing unit 43.

The control unit 47 also demultiplexes the uplink signal received from the reception radio processing unit 44, in a predetermined multiplexing method, demodulates the demultiplexed uplink signals, and performs error-correction decoding on the demodulated signals. A multiplexing method to be performed on the uplink signals may be, for example, SC-FDMA. The control unit 47 outputs the decoded uplink signals to the wired interface unit 45. The control unit 47 also extracts, from the decoded uplink signals, various signals to be referred to by the eNB 12, for example, control information on sidelink control and a parameter representing a state from a remote UE.

In addition to the above, the control unit 47 carries out various processes for performing wireless communications with UEs, such as transmission power control and sidelink control.

The control unit 47 also selects a resource pool to be used by each remote UE, on the basis of the parameter received from the remote UE via the relay UE and representing the state of the UE. In this selection, the control unit 47 selects resource pools for multiple remote UEs using the same relay UE so that different resource pools are to be assigned to the UEs, as described above.

All the examples and conditional language recited herein are intended for pedagogical purposes to aid the reader in understanding the present invention and the concepts contributed by the inventor to furthering the art, and are to be construed as being without limitation to such specifically recited examples and conditions, nor does the organization of such examples in the specification relate to a showing of superiority and inferiority of the present invention. Although the embodiments of the present invention have been described in detail, it should be understood that the various changes, substitutions, and alterations could be made hereto without departing from the spirit and scope of the invention.

What is claimed is:

1. A radio communication system comprising:
    a plurality of communication devices, wherein
    each of the plurality of communication devices is configured to store a common set of a plurality of radio resource pools, each of the plurality of radio resource pools including a plurality of radio resources, each of the plurality of radio resources being a radio resource defined by frequency and time usable for radio communication with another communication device among the plurality of communication devices,
    a first communication device among the plurality of communication devices is configured to
        select a radio resource pool from the plurality of radio resource pools in the common set, and
        transmit a signal addressed to a second communication device among the plurality of communication devices by the use of a radio resource included in the selected radio resource pool, and
    each of one or more third communication devices for relaying the radio communication between the first communication device and the second communication device among the plurality of communication devices is configured to
        select a radio resource pool from the plurality of radio resource pools in accordance with a predetermined rule, the predetermined rule being defined on the basis of a hop count at the third communication device in the radio communication and the radio resource pool selected by the first communication device, and
        transfer the signal addressed to the second communication device through a radio resource included in the selected radio resource pool to a next communication device in a relay order among the one or more third communication devices or the second communication device.

2. The radio communication system according to claim 1, wherein
    the predetermined rule is defined so that radio resource pools different from each other are selected from the plurality of radio resource pools in the common set and then are allocated to at least a part of the one or more third communication devices respectively, the at least a part of the one or more third communication devices being communication devices having consecutive hop counts among the one or more third communication devices.

3. The radio communication system according to claim 2, wherein
    each of the plurality of radio resource pools is associated with a number different from each other, and
    the predetermined rule is defined so that a resource pool associated with a first number is selected, the first number being a number obtained by adding the hop count to a number of the resource pool selected by the first communication device.

4. The radio communication system according to claim 1, wherein
    the first communication device is configured to perform carrier sensing for each of the plurality of radio resource pools in the common set to detect one or more idling radio resource pools,
    the selecting of the resource pool by the first communication device is configured to select a radio resource pool from the one or more idling resource pools detected.

5. The radio communication system according to claim 1, wherein
    each of the first communication device, the second communication device, and the one or more third communication devices is a user equipment.

6. The radio communication system according to claim 1, wherein
    a fourth communication device among the plurality of communication devices is configured to perform radio communication with the second communication device through the one or more third communication devices, and with respect to the one or more third communication devices,
    the hop count in the radio communication between the first communication device and the second communication device is equal to the hop count in the radio communication between the fourth communication device and the second communication device,
    the first communication device is configured to notify the second communication device of a parameter indicating a state of the first communication device through the one or more third communication devices,
    the fourth communication device is further configured to notify the second communication device of a parameter indicating a state of the fourth communication device through the one or more third communication devices, and
    the second communication device is configured to
        set the radio resource pool used by the first communication device and the radio resource pool used by the fourth communication device on the basis of the parameter notified from the first communication device and the parameter notified from the fourth communication device, and
        notify the first communication device and the fourth communication device of the set radio resource pool through the one or more third communication devices.

7. The radio communication system according to claim 6, wherein
    the parameter indicating a state of the first communication device includes a parameter indicating an environment of the first communication device, a parameter indicating a communication state of the first communication device, and a parameter indicating a degree of urgency of communication.

8. The radio communication system according to claim 6, wherein the second communication device is configured to set the radio resource pool used by the first communication device and the radio resource pool used by the fourth communication device from the plurality of resource pools in the common set so that the radio resource pool used by the first communication device and the radio resource pool used by the fourth communication device are different from each other.

9. The radio communication system according to claim 6, wherein
the second communication device is configured to set the radio resource pool used by the first communication device and the radio resource pool used by the fourth communication device so that the radio resource pool used by the first communication device and the radio resource pool used by the fourth communication device have an orthogonal relationship with each other.

10. The radio communication system according to claim 9, wherein
the second communication device is configured to generate schedule allocation information that includes information indicating a radio resource pool to be used by the first communication device and information indicating a radio resource pool to be used by the fourth communication device,
the second communication device is further configured to transmit the generated schedule allocation information to the first communication device and the fourth communication device through the one or more third communication devices.

11. The radio communication system according to claim 6, wherein
the second communication device is a base station, and each of the first communication device, the fourth communication device, and the one or more third communication devices is a user equipment.

12. A user equipment for relaying radio communication between a first another user equipment and a second another user equipment, the user equipment comprising:
a memory configured to store a common set of a plurality of radio resource pools, each of the plurality of radio resource pools including a plurality of radio resources, each of the plurality of radio resources being a radio resource defined by frequency and time usable by the user equipment for radio communication with the second another communication device; and
a processor coupled to the memory, the processor being configured to
select a radio resource pool from the plurality of radio resource pools in accordance with a predetermined rule, the predetermined rule being defined on the basis of a hop count at the user equipment in the radio communication and a radio resource pool selected by the first another communication device from the plurality of radio resource pools in the common set, and
relay the radio communication by the use of a resource included in the selected radio resource pool.

13. A base station for radio communication with each of a plurality of user equipments via at least another user equipment, the base station comprising:
a memory configured to store a common set of a plurality of radio resource pools, each of the plurality of radio resource pools including a plurality of radio resources, each of the plurality of radio resources being a radio resource defined by frequency and time usable by each of the plurality of user equipments for radio communication with the at least another user equipment; and
a processor coupled to the memory, the processor being configured to
set a radio resource pool to be used by the user equipment from the plurality of radio resource pools in the common set for each of the plurality of user equipments, on the basis of parameters each indicating a state of the user equipment notified from each of the plurality of user equipments, and
notify each of the plurality of user equipments of the set radio resource pool via the at least another user equipment.

14. A radio communication method in a radio communication system which includes a plurality of communication devices, the method comprising:
selecting, by a first communication device among the plurality of communication devices, a radio resource pool from a plurality of radio resource pools in a common set stored in each of the plurality of communication devices, each of the plurality of radio resource pools including a plurality of resources, each of the plurality of radio resources being a radio resource defined by frequency and time usable for radio communication with another communication device among the plurality of communication devices;
transmitting, by the first communication device, a signal addressed to a second communication device among the plurality of communication devices through a radio resource included in the selected radio resource pool, and
selecting, by one or more third communication devices each of which relays the radio communication between the first communication device and the second communication device, among the plurality of communication devices, a radio resource pool from the plurality of radio resource pools in accordance with a predetermined rule, the predetermined rule being defined on the basis of a hop count at the third communication device in the radio communication and the resource pool selected by the first communication device;
transferring, by the one or more third communication device, the signal addressed to the second communication device through a radio resource included in the selected radio resource pool to a next communication device in a relay order among the one or more third communication devices or the second communication device.

* * * * *